United States Patent
Sutarwala et al.

(10) Patent No.: US 10,808,635 B2
(45) Date of Patent: Oct. 20, 2020

(54) ENGINE CONTROLS INCLUDING DIRECT TARGETING OF IN-CYLINDER [O2]

(71) Applicant: Cummins Inc., Columbus, IN (US)

(72) Inventors: Quresh Sutarwala, Columbus, IN (US); Gayatri Adi, Columbus, IN (US); Paul V. Moonjelly, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/587,143

(22) Filed: Sep. 30, 2019

(65) Prior Publication Data

US 2020/0025121 A1 Jan. 23, 2020

Related U.S. Application Data

(63) Continuation of application No. PCT/US2018/025110, filed on Mar. 29, 2018.

(60) Provisional application No. 62/478,711, filed on Mar. 30, 2017.

(51) Int. Cl.
*F02D 41/02* (2006.01)
*F02D 41/14* (2006.01)

(52) U.S. Cl.
CPC ..... *F02D 41/0295* (2013.01); *F02D 41/1454* (2013.01); *F02D 2200/0402* (2013.01)

(58) Field of Classification Search
CPC ..... F02D 2041/1432; F02D 2200/0402; F02D 2250/36; F02D 2250/38; F02D 41/0007; F02D 41/0052; F02D 41/0062; F02D 41/0072; F02D 41/0295; F02D 41/1454; F02M 26/05; F02M 26/25
See application file for complete search history.

(56) References Cited

U.S. PATENT DOCUMENTS

| | | | |
|---|---|---|---|
| 6,705,301 B2 | 3/2004 | Dollmeyer et al. | |
| 6,948,475 B1* | 9/2005 | Wong | F02M 26/19 123/299 |
| 7,117,078 B1 | 10/2006 | Gangopadhyay | |
| 7,155,332 B2* | 12/2006 | Yamada | G01F 1/86 701/108 |
| 7,389,771 B2 | 6/2008 | Andrews et al. | |
| 7,715,975 B2 | 5/2010 | Yamaoka et al. | |
| 7,784,451 B2* | 8/2010 | Chi | F02D 41/1401 123/568.19 |
| 7,946,162 B2 | 5/2011 | Vennettilli et al. | |

(Continued)

FOREIGN PATENT DOCUMENTS

| | | |
|---|---|---|
| WO | 2016130517 | 8/2016 |
| WO | 2016175809 | 11/2016 |

OTHER PUBLICATIONS

Search Report and Written Opinion, PCT Appln. No. PCT/US18/25110, dated Jun. 27, 2018, 6 pgs.

*Primary Examiner* — Jesse S Bogue
(74) *Attorney, Agent, or Firm* — Taft Stettinius & Hollister LLP

(57) ABSTRACT

Unique engine controls and apparatuses, methods and systems relating to the same are disclosed. One embodiment is method which utilizes an in-cylinder [O2] mass fraction model to generate exhaust gas recirculation (EGR) fraction references for both transient and steady state operating conditions. Further embodiments, forms, objects, features, advantages, aspects, and benefits shall become apparent from the following description and drawings.

22 Claims, 5 Drawing Sheets

(56) References Cited

U.S. PATENT DOCUMENTS

| | | | |
|---|---|---|---|
| 8,010,276 B2* | 8/2011 | Oehlerking | F02D 41/0007 |
| | | | 701/106 |
| 8,103,427 B2 | 1/2012 | Osburn et al. | |
| 8,251,049 B2 | 8/2012 | Kang et al. | |
| 9,371,781 B2* | 6/2016 | Schnorbus | F02D 13/0219 |
| 9,726,091 B2* | 8/2017 | Ruth | F02D 41/144 |
| 10,221,798 B2* | 3/2019 | Mischler | F02D 41/1461 |
| 2013/0268176 A1* | 10/2013 | Song | F02D 41/0072 |
| | | | 701/102 |
| 2014/0060506 A1 | 3/2014 | Shaver | |
| 2016/0131057 A1 | 5/2016 | Lahti et al. | |
| 2018/0038255 A1* | 2/2018 | Garimella | F02D 35/02 |
| 2018/0266343 A1* | 9/2018 | Garimella | F02D 35/025 |
| 2018/0274467 A1* | 9/2018 | Garimella | F02D 41/0002 |

\* cited by examiner

ENGINE CONTROLS INCLUDING DIRECT TARGETING OF IN-CYLINDER [O2]

CROSS-REFERENCE

The present application is a continuation of International Patent App. No. PCT/US18/25110 filed on Mar. 29, 2018, which claims the benefit of U.S. Application Ser. No. 62/478,711 filed Mar. 30, 2017, the disclosures of which are hereby incorporated by reference.

BACKGROUND

The present application relates generally to controls for internal combustion engine systems and more particularly to controls for internal combustion engines including direct targeting of in-cylinder [O2] mass fraction. Existing attempts to provide air handling and EGR controls for internal combustion engines suffer from a number of shortcomings and disadvantages including those respecting transient performance and violation of emissions targets or limits among others. There remains a significant need for the unique apparatuses, methods, systems and controls disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

Unique engine controls and apparatuses, methods and systems relating to the same are disclosed. One embodiment is method which utilizes an in-cylinder [O2] mass fraction model to generate exhaust gas recirculation (EGR) fraction references for both transient and steady state operating conditions. Further embodiments, forms, objects, features, advantages, aspects, and benefits shall become apparent from the following description and drawings.

DETAILED DESCRIPTION OF ILLUSTRATIVE EMBODIMENTS

Figure 1:
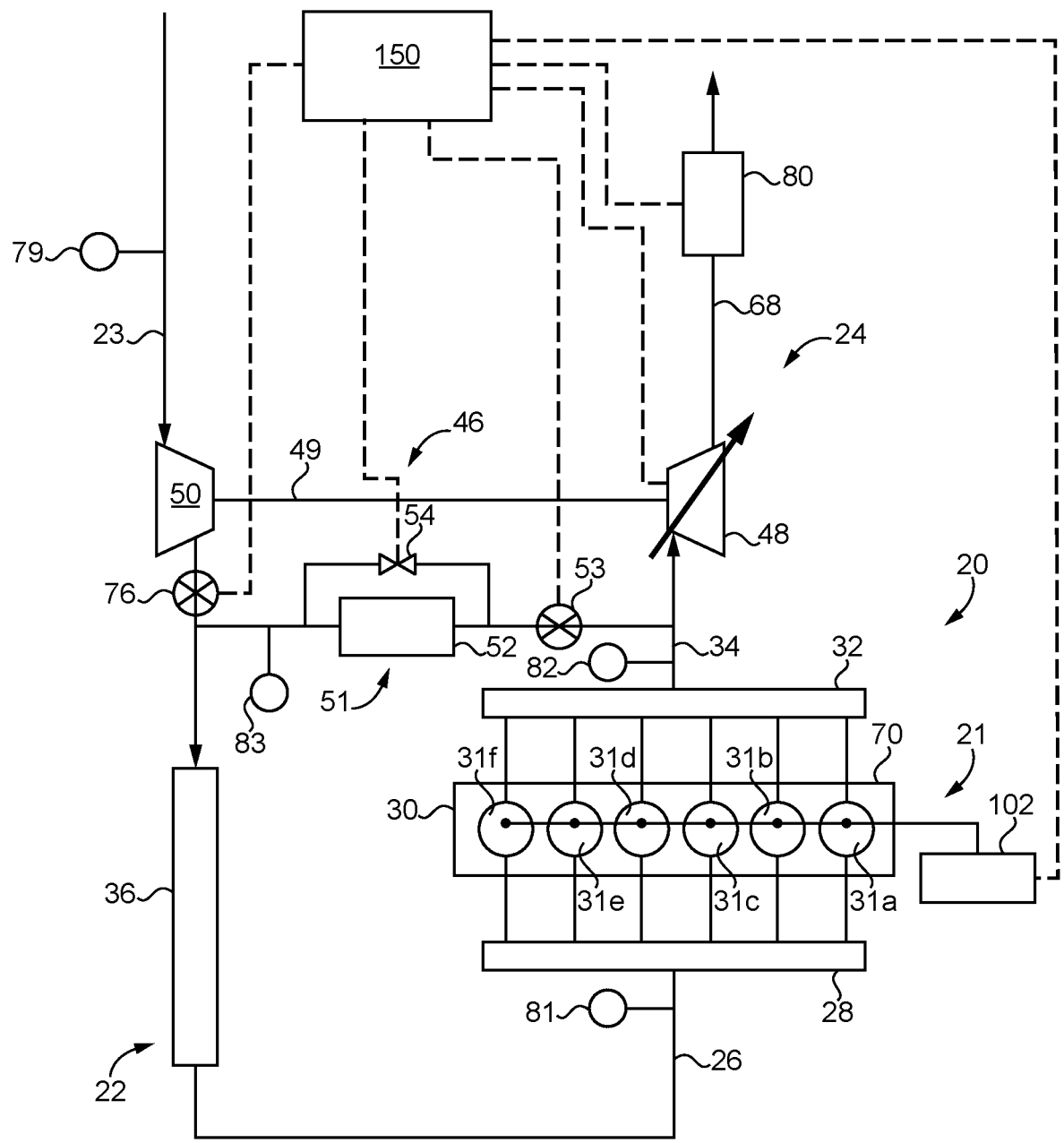
FIG. 1 is a schematic diagram illustrating certain aspects of an exemplary internal combustion engine system.

With reference to FIG. 1, there are illustrated certain aspects of an exemplary internal combustion engine system 20. In the illustrated embodiment, engine system 20 includes a fueling system 21 which is operable to provide fuel to engine 30 from a fuel source 102. In an exemplary form, fuel source 102 contains a supply of diesel fuel, engine system 20 is structured as a diesel engine and fueling system 21 is structured as a diesel fueling system such as a high pressure common rail fueling system with direct in-cylinder injection. In other embodiments engine system 20 and fueling system 21 may be configured as spark-ignition systems, port injection systems, or as dual-fuel of multi-fuel systems and alternate or additional fuel supplies with alternate or additional types of fuel may be provided.

Engine system 20 includes engine 30 connected with an intake system 22 for providing a charge flow to engine 30 and an exhaust system 24 for output of exhaust. Engine 30 includes an engine block 70 that at least partially defines the cylinders 31a, 31b, 31c, 31d, 31e, 31f (collectively referred to as cylinders 31.) A plurality of pistons (not shown) are slidably disposed within respective cylinders 31 to reciprocate between a top-dead-center position and a bottom-dead-center position. Each of the cylinders 31, its respective piston, and the cylinder head form a combustion chamber. In the illustrated embodiment, engine 30 includes six such combustion chambers. However, it is contemplated that engine 30 may include a greater or lesser number of cylinders and combustion chambers and that cylinders and combustion chambers may be disposed in an "in-line" configuration, a "V" configuration, or in any other suitable configuration.

In an exemplary embodiment, engine 30 is a four stroke engine. That is, for each complete engine cycle (i.e., for every two full crankshaft rotations), each piston of each cylinder 31 moves through an intake stroke, a compression stroke, a combustion or power stroke, and an exhaust stroke. Thus, during each complete cycle for the depicted six cylinder engine, there are six strokes during which air is drawn into individual combustion chambers from intake supply conduit 26 and six strokes during which exhaust gas is supplied to exhaust manifold 32.

The engine 30 includes cylinders 31 connected to the intake system 22 to receive a charge flow and connected to exhaust system 24 to release exhaust gases produced by combustion. Exhaust system 24 may provide exhaust gases to drive a turbocharger 46. In other embodiments, multiple turbochargers are included to provide high pressure and low pressure turbocharging stages that compress the intake flow.

Exhaust system 24 is operably coupled to intake system 22 by exhaust gas recirculation (EGR) system 51. In the illustrated embodiment, EGR system 51 is provided as a high pressure loop EGR system. In other embodiments, EGR system 51 may be provided as a low pressure loop EGR system. In further embodiments, both a low pressure loop and a high pressure loop EGR system 51 may be provided. In the illustrated embodiment, EGR system 51 includes EGR valve 53, which is operably coupled with and controllable by electronic control system 150, EGR cooler 52 and a bypass valve 54 which is also operably coupled with and controllable by electronic control system 150. In some embodiments, one or both of EGR cooler 52 and bypass valve 54 may be omitted. By varying the position of EGR valve 53, a selectably variable portion of the exhaust output of cylinder(s) 31 can be recirculated to the engine intake system 22.

Intake system 22 includes an inlet supply conduit 26 connected to an engine intake manifold 28, which distributes the charge flow to cylinders 31 of engine 30. Exhaust system 24 is also coupled to engine 30 with an engine exhaust manifold 32. Exhaust system 24 includes an exhaust conduit 34 extending from exhaust manifold 32 to an exhaust valve. In the illustrated embodiment, exhaust conduit 34 extends to variable-geometry turbine 48 of turbocharger 46. In other embodiments variable geometry turbine 48 may be provided with a wastegate and/or provided as a fixed geometry turbine. In some embodiments multiple turbochargers may be provided.

An aftertreatment system 80 is operably coupled with outlet conduit 68. The aftertreatment system 80 may include, for example, a diesel oxidation catalyst (DOC) device, particulate removing devices (DPF, CDPF), constituent absorbers or reducers (SCR, AMOX, LNT), reductant systems, and other components if desired.

Compressor 50 receives fresh air flow from intake air supply conduit 23. Inlet supply conduit 26 may include a charge air cooler 36 downstream from compressor 50 and intake throttle 76. In another embodiment, a charge air cooler 36 is located in the intake system 22 upstream of intake throttle 76. Charge air cooler 36 may be disposed within inlet air supply conduit 26 between engine 30 and compressor 50, and embody, for example, an air-to-air heat exchanger, an air-to-liquid heat exchanger, or a combination of both to facilitate the transfer of thermal energy to or from the charge flow directed to engine 30.

In operation of engine system 20, fresh air is supplied through inlet air supply conduit 23. The fresh air flow or combined flows can be filtered, unfiltered, and/or conditioned in any known manner, either before or after mixing with the EGR flow from EGR system 51 when provided. The intake system 22 may include components configured to facilitate or control introduction of the charge flow to engine 30, and may include intake throttle 76, one or more compressors 50, and charge air cooler 36. In the illustrated embodiment intake throttle 76 is downstream of compressor 50 and configured to regulate a flow of atmospheric air to engine 30. The intake throttle 76 may be connected upstream or downstream of compressor 50 via a fluid passage and configured to regulate a flow of atmospheric air and/or combined air/EGR flow to engine 30.

Electronic control system 150 is operably coupled with actuators, switches, armatures, motors, pumps or other actuation devices associated with fueling system 21, intake throttle 76, variable geometry turbine 48 and EGR valve 53, and is configured to provide control commands thereto that control the fueling and air handling of fueling system 21 and engine system 20. By adjusting the positioning of intake throttle 76, variable geometry turbine 48 and EGR valve 53, the fresh air flow, EGR flow and charge flow, which includes the combined fresh air flow and EGR flow, can be controlled. Electronic control system 150 is further structured to control engine operations and fueling of cylinders 31 with fueling system 21 to provide the desired engine operation.

In certain embodiments, the electronic control system 150 forms a portion of a processing subsystem including one or more computing devices having memory, processing and communication hardware. The electronic control system 150 may be a single device or a plurality of distributed devices which may communicate over a network such as a controller area network (CAN), and the functions of the electronic control system 150 may be performed by hardware or instructions provided on a computer readable storage medium. The electronic control system 150 may be included within, partially included within, or completely separated from an engine controller (not shown). The electronic control system 150 may be in communication with any sensor or actuator throughout the systems disclosed herein, including through direct communication, communication over a datalink, and/or through communication with other controllers or portions of the processing subsystem that provide sensor and/or actuator information to the electronic control system 150.

Engine system 20 includes a number of sensor systems which are in operative communication with and provide information to electronic control system 150. Unless indicated otherwise, the sensors disclosed herein may comprise physical sensors, virtual sensors, and/or combinations thereof. Engine system 20 includes intake air sensors 79 which may include a mass flow sensor, a humidity sensor, a temperature sensor, a pressure sensor and/or other sensors adapted to provide information indicative of characteristics of the intake air to electronic control system 150. Engine system 20 also includes intake manifold sensors 81 which may include a temperature sensor, a pressure sensor and other sensors adapted to provide information indicative of characteristics of intake manifold conditions to electronic control system 150. Engine system 20 further includes exhaust sensors 82 which may include a temperature sensor, a pressure sensor, an exhaust oxygen or lambda sensor, and other sensors adapted to provide information indicative of characteristics of exhaust manifold conditions and characteristic of the exhaust produced by engine 30 to electronic control system 150. Engine system 20 further includes air EGR sensors 83 which may include a mass flow sensor and/or other sensors adapted to provide information indicative of characteristics of the EGR flow to electronic control system 150. It shall be appreciated that the foregoing sensors may be utilized to provide information to electronic control system 150 to facilitate the controls disclosed herein.

Figure 2:
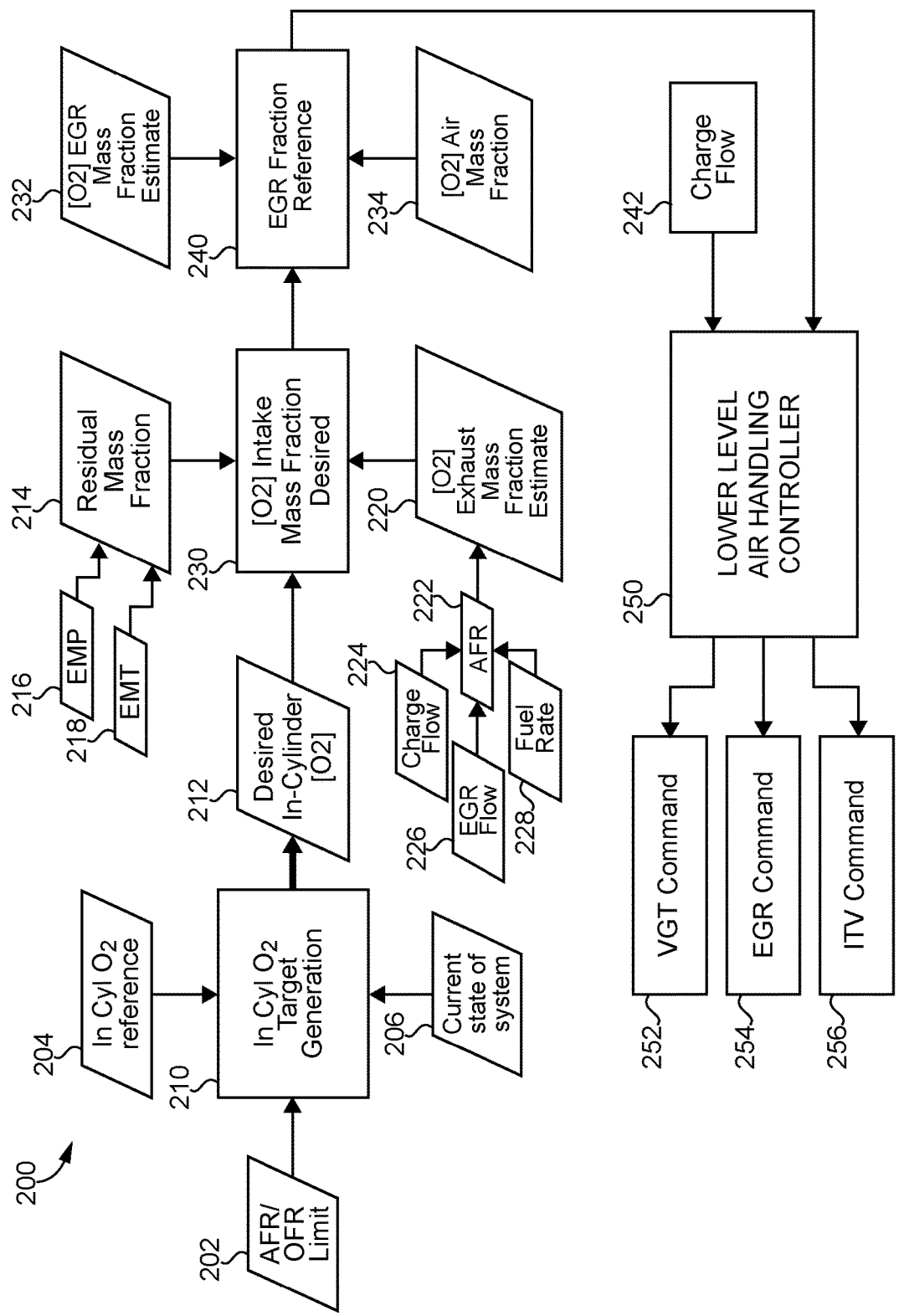
FIG. 2 is a block diagram illustrating certain aspects of exemplary controls for an internal combustion engine system.

With reference to FIG. 2, there is illustrated a block diagram depicting certain aspects of exemplary controls 200 which are operable to control operations of an internal combustion engine system such as engine system 20 and which may be stored and executed by one or more non-transitory memory and processing devices of an electronic control system such as electronic control system 150. In describing controls 200, reference is made to oxygen mass fraction which is defined as a fraction or percentage of constituent mass to a total mass and which may be denoted as "[O2]" or "[O2] mass fraction" in the present disclosure. It shall be appreciated that other parameters pertaining to O2 may also be utilized in connection with the embodiments disclose herein, for example, O2 molar fraction or O2 mass.

Controls 200 include in-cylinder [O2] target generation block 210 which receives differently determined [O2] values from AFR/OFR limit block 202, in-cylinder [O2] reference block 204 and system condition block 206 as inputs. In-cylinder [O2] target generation block 210 determines an in-cylinder [O2] target value in response to the received inputs and the in-cylinder [O2] target value is provided to desired in-cylinder [O2] block 212. In certain embodiments, in-cylinder [O2] target generation block 210 determines an in-cylinder [O2] target by selecting the minimum value which it receives from blocks 202 and 204 in response to the input received from block 206. In certain embodiments, block 210 determines an in-cylinder [O2] target by determining a weighted average of multiple inputs, for example a weighted average between inputs 202 and 204 which may be tuned or varied to effect a desired trade-off between the various emissions constraints associated with these inputs. In certain forms the desired trade off may balance two or more of engine out NOx, smoke, soot and hydrocarbon. It shall be appreciated that depending on the weighted average selected block 210 may be an in-cylinder [O2] target by selecting a minimum value or a maximum value either of which could be weighted at 100% or a weighted average.

The [O2] value provided by AFR/OFR limit block 202 may be generated using a lookup table such as a three dimensional lookup table which receives engine speed and fueling values or engine speed and engine output torque values as inputs and outputs an [O2] value corresponding to the received inputs. The [O2] values of the lookup table utilized by block 202 may be empirically determined using one or more sets of measurement data corresponding to steady state operating conditions and/or transient operating conditions. As further described in connection with FIG. 3, the [O2] values of the lookup table may be empirically determined to provide predetermined exhaust emissions characteristics, for example, exhaust smoke may be empirically characterized and limited to a desired emissions threshold by the [O2] values of the lookup table.

The [O2] value provided by in-cylinder [O2] reference block 204 may be generated from a lookup table such as a three dimensional lookup table which receives engine speed and fueling, or engine speed and engine output torque as inputs and outputs an [O2] value in response to the received inputs. The [O2] value provided by block 210 may alternatively be generated from an optimization operation which receives engine speed, fueling, engine load and constraints such as cylinder temperature and pressure constraints and outputs an [O2] value in response to the received inputs. The [O2] value provided by in-cylinder [O2] reference block 204 differs from the [O2] value provided by AFR/OFR limit block 202 in that it is constrained by different emissions or other operational goals or limits, for example, engine out NOx or engine out NOx in combination with steady state limits on other emissions such as smoke, soot, hydrocarbon or combinations thereof.

The input provided by system condition block 206 may comprise one or more values pertaining to one or more conditions or operating states of the internal combustion engine system. The values may pertain to a current condition or operating state of the internal combustion engine system, a prior condition or operating state of the internal combustion engine system, or a predicted condition or operating state of the internal combustion engine system. The values may pertain to or may be determined in response to received input information including engine speed, fueling, a charge flow command, actual charge flow, fresh air flow and EGR flow. In certain forms the input provided by system condition block 206 may be based upon a physics-based model indicative of an operational state of an internal combustion engine system. The values provided by system condition block 206 can be utilized by block 210 in selecting or modifying the values provided by block 202 and block 204. For example, the inputs provided by system condition block 206 may be utilized in scaling an in-cylinder [O2] reference value such as described below in connection with FIG. 6. As a further illustrative example, block 206 may provide a charge flow error (or a charge flow value from which a charge flow error may be determined) and depending on the value of the charge flow error, different selections of and modifications or scaling of the inputs received from blocks 202 and 204 may be performed to provide an O2 value output by block 210. Accordingly, it shall be understood that block 206 may be configured to provide block 210 with inputs utilized to select between and scale inputs received from blocks 202 and 204. In certain forms block 206 can provide an O2 reference generated from charge flow scaling. In certain forms the O2 reference generated from charge flow scaling can also be provided in block 202 or block 204.

Controls 200 include residual mass fraction block 214 which receives inputs 216 and 218 and determines a residual mass fraction in response to the received inputs. Input 216 is indicative of an exhaust manifold pressure and may be determined using information received from a pressure sensor. Input 218 is indicative of an exhaust manifold temperature and may be determined using information received from a temperature sensor. In an exemplary embodiment residual mass fraction block 214 may first determine a residual mass value in accordance with the equation $RM=K_{MD}*(EMP/EMT)$, where RM is the residual mass determined by block 214, $K_{MD}$ is a mass density constant that may be calculated as a function of engine displacement, stroke, compression ratio, connecting rod length, and intake and exhaust valve closing and opening, EMP is an exhaust manifold pressure value such that provided by input 216, and EMT is an exhaust manifold temperature value such as that provided by input 218. Residual mass fraction block 214 may then determine a residual mass fraction in accordance with the equation $RMF=RM/(RM+CM)$ where RMF is the residual mass fraction, RM is the residual mass value from the first determination above, and CM is the charge mass which may be determined using information from one or more mass flow sensors, for example, information from a charge mass flow sensor or information from an intake air flow sensor in combination with an EGR flow sensor.

AFR block 222 receives input from charge flow block 224, EGR flow block 226 and fuel rate block 228, and utilizes the received inputs to determine an air-to-fuel ratio value. Charge flow block 224 may provide a charge flow rate using information from one or more mass flow sensors. EGR flow block 226 may provide an EGR flow rate using information from one or more mass flow sensors. Fuel rate block 228 may provide a fueling rate determined using a fueling command and/or a response indicative of actual fueling. In an exemplary embodiment, AFR block 222 determines an air-to-fuel ratio value in accordance with the equation $AFR=(CF-GRF)/FR$, where AFR is the air-to-fuel ratio value determined by AFR block 222, CF is a charge flow value which may be received from block 224, EGRF is the EGR flow value which may be received from block 226 and FR is the fueling rate which may be received from block 228.

The output of AFR block 222 is provided as input to exhaust [O2] mass fraction estimate block 220 which utilized the received input to determine an exhaust [O2] mass fraction estimate. In an exemplary embodiment, exhaust [O2] mass fraction estimate block 220 determines an exhaust [O2] mass fraction estimate in accordance with the equation $[O2]Exh=[O2]Air*((AFR-AFRStoich)/(1+AFRStoich))$, where [O2]Exh is the exhaust [O2] mass fraction estimate determined by block 220, [O2]Air is the ambient or intake air [O2] mass fraction which may be set to a predetermined value or may be calculated taking into account influencing factors such as altitude, temperature and humidity, AFR is the air-to-fuel ratio determined by block 222, and AFRStoich is the stoichiometric air-to-fuel ratio which may be set to a predetermined value.

The values of blocks 212, 214 and 220 are provided as inputs to intake [O2] mass fraction desired block 230 which determines a desired intake [O2] mass fraction from the received inputs. In an exemplary embodiment, block 230 may determine a desired intake [O2] mass fraction in accordance with the equation: D[O2]IN=((D[O2]IC)−(RMF*[O2]Exh))/(1−RMF), where D[O2]IN is the desired or target intake oxygen mass fraction determined by block 230, D[O2]IC is the desired or target in-cylinder oxygen mass fraction received from block 212, RMF is the residual mass fraction received from block 214, and [O2]Exh is the exhaust [O2] mass fraction estimate received from block 220.

Controls 200 include EGR fraction reference block 240 which receives inputs from intake [O2] mass fraction desired block 230, EGR [O2] mass fraction estimate block 232 and [O2] air mass fraction block 234 and determines an EGR fraction reference from the received inputs. In an exemplary embodiment EGR fraction reference block 240 may determine an EGR fraction reference in accordance with the equation Xegr=(D[O2]IN−[O2]AIR)/([O2]EGR−[O2]AIR), where Xegr is the EGR fraction reference determined by block 240, D[O2]IN is the desired or targeted intake [O2] mass fraction determined by block 230, [O2] EGR is the EGR [O2] mass fraction determined by block 232, and [O2]AIR is the intake air [O2] mass fraction determine by block 234. It shall be appreciated that in certain embodiments block 232 may determine [O2]Exh rather than [O2]EGR, where [O2]Exh is the exhaust [O2] mass fraction and may be utilized in place of [O2]EGR.

The EGR fraction reference determined by block 240 is provided as an input to lower level air handling controller 250. A charge flow input from block 242 is also provided as an input to lower level air handling controller 250. In an exemplary embodiment, lower level air handling controller 250 is provided as a closed loop feedback controller with two feedback loops for charge flow and EGR fraction, respectively. In the illustrated embodiment, lower level air handling controller 250 is operable to provide VGT CMD output 252 which provides a control command for a variable geometry turbine, EGR CMD output 254 which provides a control command for an EGR valve, and ITV CMD output 256 which provides a control command for an intake throttle valve. Commands 252, 254 and 256 can be provided to respective actuators effective to control the operation of an internal combustion system.

Figure 3:
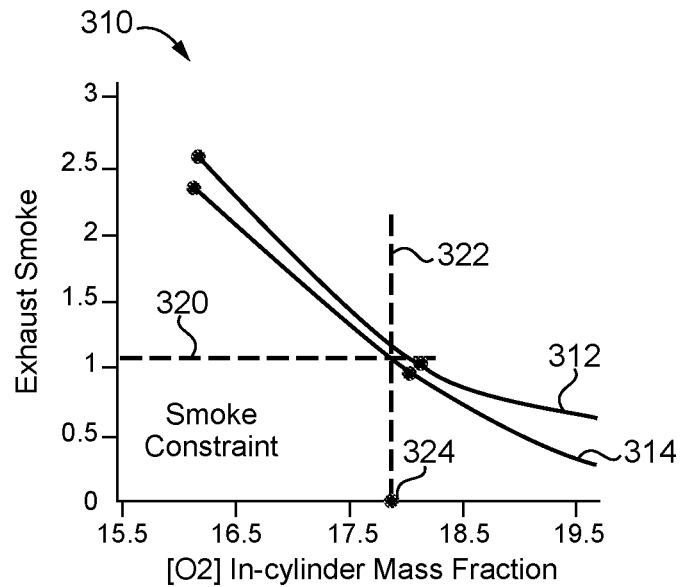
FIG. 3 illustrates graphs depicting exhaust smoke as a function of in-cylinder [O2] mass fraction and air-to-fuel ratio as a function of in-cylinder [O2] mass fraction.
Figure 3:
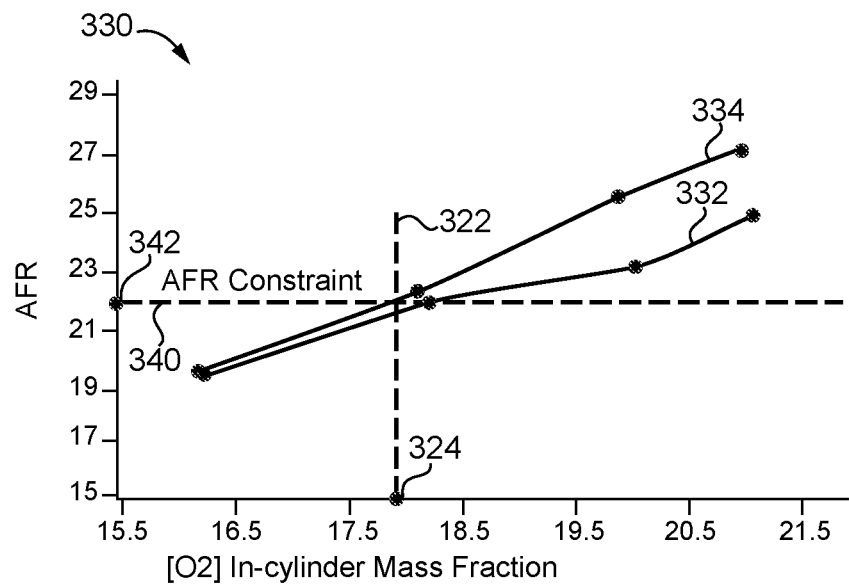

With reference to FIG. 3 there are illustrated graphs 310 and 330. Graph 310 illustrates exhaust smoke as detected by an exhaust smoke detector on its Y-axis as a function of an in-cylinder [O2] mass fraction estimate on its X-axis. Curves 312 and 314 represent the variation in exhaust smoke with in-cylinder [O2] mass fraction estimate for two different empirical data sets. Line 320 indicated a predetermined constraint on exhaust smoke established by desired emissions criteria. Line 322 indicates an X-axis value 324 established by the intersection of line 320 with curves 312 and 314. The location of line 322 and value 324 established a limit on in-cylinder [O2] mass fraction effective to prevent or mitigate potential violation of the smoke limit established by line 320. It shall be appreciated that similar techniques may be used to establish X-axis values pertaining to other emissions characteristics, for example, engine-out hydrocarbon and engine-out soot. Limits on any of the foregoing emissions may be established using one or more empirical data sets. In certain forms, the one or more empirical data sets account for emissions for transient operation or emissions for both steady-state and transient operation. In certain forms, a plurality of inputs accounting for two or more of smoke, soot and hydrocarbon may be provided as inputs to generate an in-cylinder [O2] target, for example, as described in connection with block 210. It shall also be appreciated that any of the foregoing translations to the air-to-fuel (AFR) domain may alternatively be performed to the oxygen-to-fuel (OFR) domain.

Graph 330 illustrates air-to-fuel ratio (AFR) on its Y-axis as a function of an in-cylinder [O2] mass fraction estimate on its X-axis. Curves 332 and 334 represent the variation in AFR with in-cylinder [O2] mass fraction estimate for two different empirical data sets corresponding to the data sets for curves 312 and 314, respectively. Line 322 and X-axis value 324 established in connection with graph 310 are translated onto graph 330. The intersection of line 322 with curves 332 and 334 establishes the location of line 340 which indicates an AFR limit or constraint 342. After translation of the in-cylinder [O2] mass fraction estimate from the smoke limit domain to the AFR domain, minimum in-cylinder [O2] values (or maximum EGR fraction values) can be established as a function of the AFR constraint value 342 and a current charge flow rate. As noted above, these values may be utilized to establish the output value of a lookup table utilized in connection with block 202.

Graphs 310 and 330 illustrate an exemplary implementation in which an in-cylinder [O2] mass fraction target is established to mitigate smoke using an AFR or OFR limit ratio based on steady state or previous transient data. Based on the state of the system a minimum in-cylinder [O2] mass fraction reference is generated which is the minimum [O2] target that needs to be met to prevent violation of emission constraints. In cases of heavy transients, the minimum in-cylinder [O2] required to prevent the AFR/OFR limit from being broken is higher than the minimum allowable in-cylinder [O2] when AFR/OFR constraints are met. This approach enables a method to mitigate or prevent the emission constraint from being violated.

Figure 4:
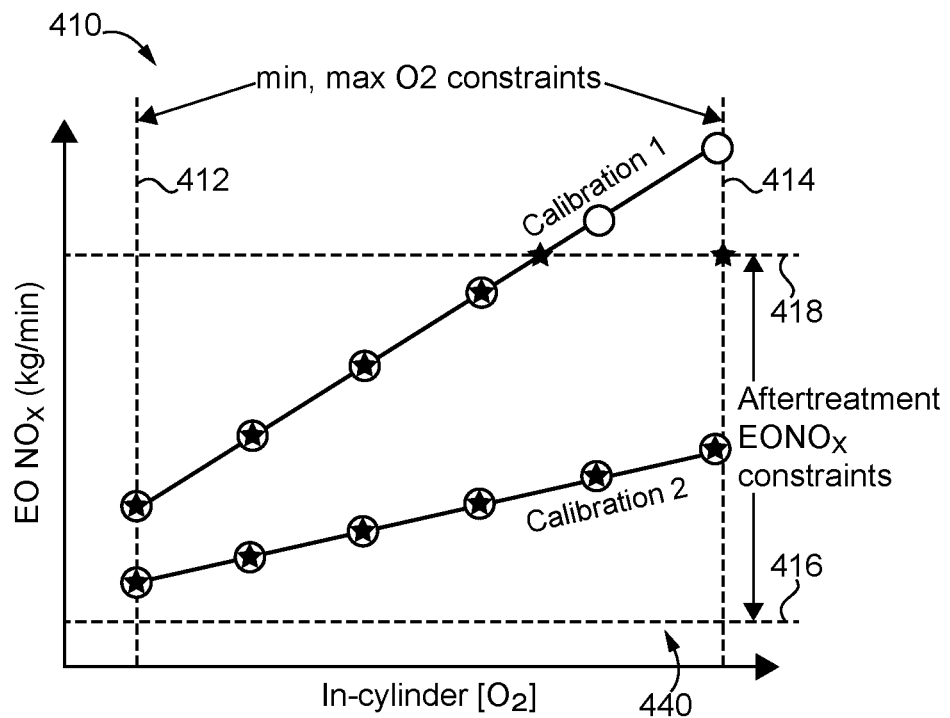
FIG. 4 illustrates graphs depicting engine-out NOx as a function of in-cylinder [O2] mass fraction.
Figure 4:
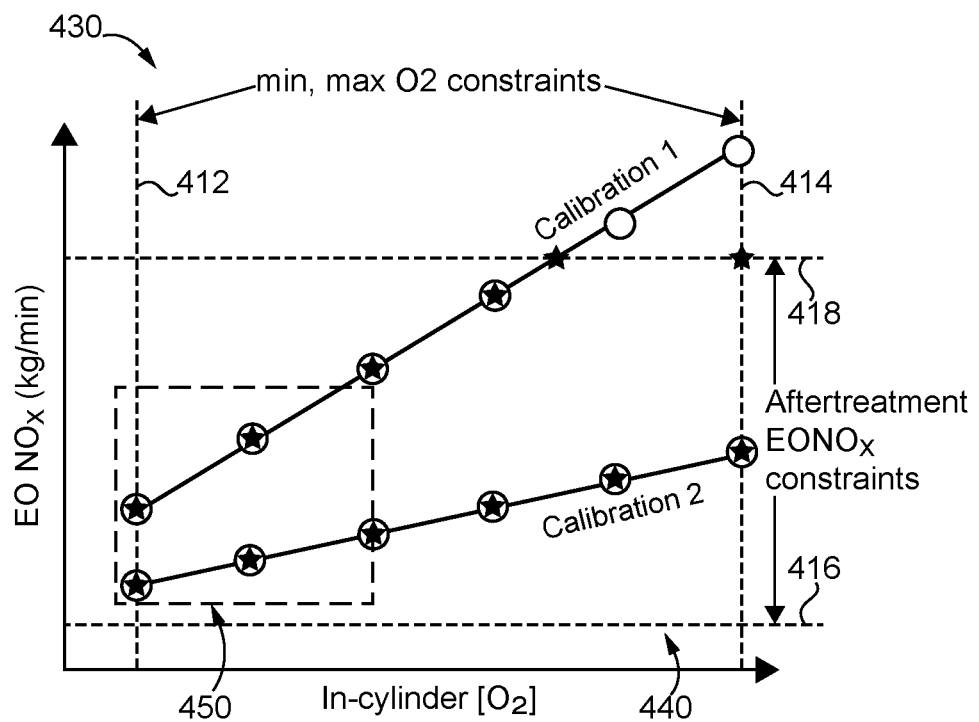

With reference to FIG. 4 there are illustrated graphs 410 and 430 depicting engine-out NOx (kg/min) is on the Y-axis as a function in-cylinder [O2] mass fraction on the X-axis. Region 440 is bounded and established by minimum [O2] constraint 412, maximum [O2] constraint 414, minimum engine-out NOx constraint 416 and maximum engine-out NOx constraint 418 and represents the available control space that is in compliance with established engine-out NOX limits and [O2] mass fraction limits. Graph 410 represents the available space for steady-state operation of an engine system in which the entire bounded region 440 is available. Graph 430 represent transient operation of the engine system in which a second region 450 which overlaps with a portion of region 440 is unavailable due to an emissions limit such as an exhaust smoke limit.

Figure 5:
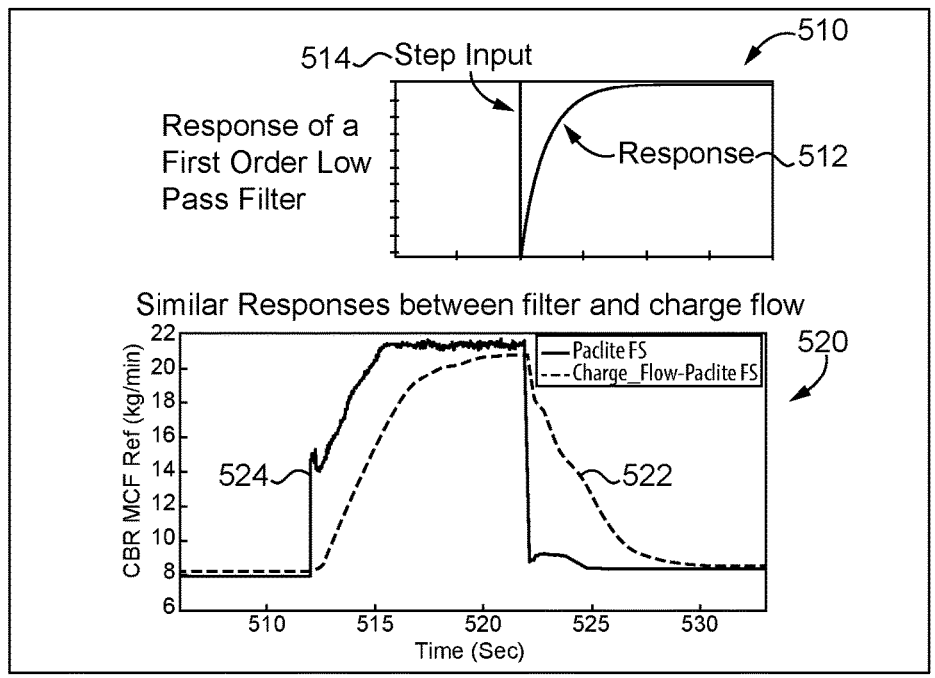
FIG. 5 illustrates graphs depicting a response of a first order low pass filter to a step function and a response of an actual charge flow to a commanded charge flow in an internal combustion engine system.

With reference to FIG. 5 there is illustrated a graph 510 depicting a response curve 512 of a first order low pass filter to a step input 514. Graph 520 depicts mass charge flow on its Y-Axis as a function of time on its X-Axis. In graph 520 it can be seen that actual charge flow 522 has a similar response to a charge flow command curve 524 as the response of the first order low pass filter of graph 510. In light of the aforementioned response characteristics, in-cylinder [O2] target generation, the physics of the engine flow parameters, the faster response of the EGR loop which incorporates the natural filtering action of the flows can be used to update a desired in-cylinder [O2] reference. Using a flow tracking error as a metric, an exemplary technique modifies the in-cylinder [O2] reference and provides a virtual knob for direct performance tuning and calibration.

Figure 6:
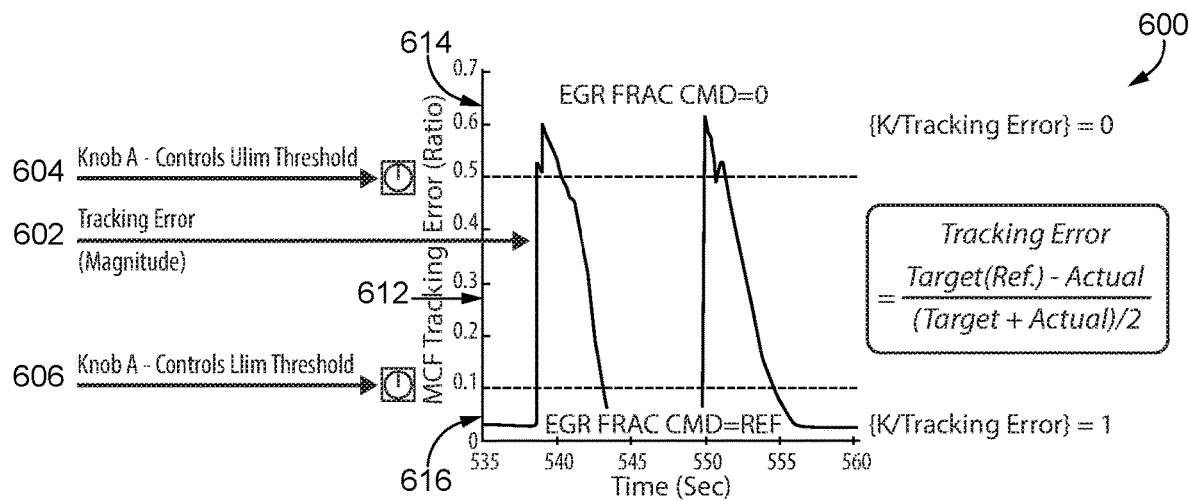
FIG. 6 illustrates graphs depicting a mass charge flow tracking error as a function of time and calibratible upper and lower thresholds providing operating regions in which different scaling operations are performed.

With reference to FIG. 6 there is illustrated a graph 600 depicting a mass charge flow tracking error ratio on its Y-axis as function of time. Curve 602 depicts the magnitude of mass charge flow tracking error over time. In an exemplary embodiment, mass charge flow tracking error may be calculated as difference between a reference/target value and the current flow value, normalized by an average of the reference and actual value, for example, in accordance with the equation TE=(TMF−AMF)/(½*(TMF+AMF)), where TE is the tracking error, TMF is the reference/target mas flow value and AMF is the actual mass flow value.

Upper limit threshold 604 and lower limit threshold 606 may be established a priori during calibration or may be dynamically adjusted. Thresholds 604 and 606 are used to convert the flow tracking error into a scaling factor which is then used to modify an in-cylinder [O2] reference value, such as the value output by in-cylinder [O2] target generation block 210 to desired in-cylinder [O2] block 212. Alternatively, the scaling can be used to scale the EGR fraction reference value such as the value generated by EGR fraction reference block 240.

As shown in FIG. 6 the scaling factor differs depending upon whether curve 602 is between upper threshold 604 and lower threshold 606, above upper threshold 604, or below lower threshold 606. In embodiments where the EGR fraction reference is scaled, the determination of the scaling factor values may be performed in accordance with the following inequalities. If TU>TE>TL, then XegrTR_Ref= (K/TE)*XegrSS_Ref, where TU is the upper threshold, TE is the mass charge flow tracking error, TL is the lower threshold, XegrTR_Ref is the scaled EGR fraction reference, K is a predetermined scaling factor, and XegrSS_Ref is the nominal steady state EGR fraction reference. It shall be appreciated that this inequality corresponds to region 612. If TE>TU, then XegrTR_Ref=0 (i.e., EGR=0%). It shall be appreciated that this inequality corresponds to region 614. If TE<TL, then EGR=XegrTR_Ref=EGRRefCal, where EGRRefCal is the nominal calibrated EGR reference value. It shall be appreciated that this inequality corresponds to region 616.

In embodiments in which the in-cylinder [O2] reference value is scaled, the determination of the scaling factor values may be performed in accordance with the following inequalities. If TU>TE>TL, then [O2]ICRefTR={(K/TE)* ([O2]HighLimit−[O2]ICRefSS)}+[O2]ICRefSS where TU is the upper threshold, TE is the mass charge flow tracking error, TL is the lower threshold, [O2]ICRefTR is the scaled in-cylinder [O2] reference, K is a predetermined scaling factor, [O2]HighLimit is a predefined user calibrated number which can also be set to the value of [O2] air mass fraction, and [O2]ICRefSS is the nominal steady state in-cylinder [O2] reference. It shall be appreciated that this inequality corresponds to region 612. If TE>TU, then [O2]ICRefTR=[O2]HighLimit. It shall be appreciated that this inequality corresponds to region 614. If TE<TL, then [O2]ICRefTR=[O2]ICRefSS. It shall be appreciated that this inequality corresponds to region 616. It shall be appreciated that [O2]ICRefSS can be a nominal steady state reference or another O2 reference that could be from a table based lookup or another algorithm, for example, as provided by block 202.

It shall be appreciated that the scaling factor (K/TE) represents one non-limiting example and that a number of additional or alternative factor may be utilized. Such factors may be linear or non-linear. In one further non-limiting scaling factor example, Delta_TUTL=TU−TL and TE_Final=TE−TL. If TE_Final>DeltaTUTL, then TE_Final=DeltaTUTL. If TE_final<0, then TE_Final=0. If 0<TE_Final<DeltaTUTL, then Scaling factor=1−(TE_Final/DeltaTUTL).

Further description of a number of exemplary embodiments shall now be provided. In a first exemplary embodiment direct in-cylinder [O2] mass fraction targeting may be performed using the inverse of a physics-based [O2] mass fraction estimation model to provide EGR fraction references for transient and steady state operating conditions which account for the current operating state of the internal combustion engine. The EGR fraction reference may be utilized by a lower level air-handling controller to control one or more air handling system actuators target a desired in-cylinder [O2] mass fraction. An in-cylinder [O2] mass fraction estimation model may be inverted to solve for EGR fraction as a function of in-cylinder [O2] mass fraction and various state variables of the system. A dynamically calculated EGR fraction command may be provided to air handling controller to target a desired or targeted in-cylinder [O2] mass fraction. The targeted in-cylinder [O2] mass fraction may be calculated based on an optimization algorithm, and may be modified by adjusting an in-cylinder [O2] mass fraction reference in response to current state of the system and an air-to-fuel or oxygen-to-fuel ratio limit. The targeted in-cylinder [O2] mass fraction may also be modified by balancing transient response and emissions is also proposed via performance calibration thresholds which generate scaled in-cylinder [O2] mass fraction targets in response to charge flow tracking error.

A second exemplary embodiment is a system comprising: an electronic control system in operative communication with an internal combustion engine system, the electronic control system being structured to determine an in-cylinder [O2] mass fraction target using a first input, a second input, and a third input, the first input configured to provide a first limit on a first engine emission characteristic, the second input configured to provide a second limit on a second engine emission characteristic, the third input configured to indicate a condition of the internal combustion engine system, determine an intake [O2] mass fraction target in response to the in-cylinder [O2] mass fraction target, a residual mass fraction, and an exhaust [O2] mass fraction, determine an EGR fraction reference in response to the intake [O2] mass fraction target, an EGR [O2] mass fraction, and an air [O2] mass fraction, and control one or more air handling actuators of the internal combustion engine system in response to the EGR fraction reference.

In certain forms of the first exemplary embodiment, the in-cylinder [O2] target is determined as one of the minimum, the maximum and a weighted function of the first input, the second input, and the third input. In certain forms, the intake [O2] mass fraction target is determined in accordance with the equation D[O2]IN=((D[O2]IC)−(RMF*[O2]Exh))/(1− RMF), where D[O2]IN is the intake [O2] mass fraction target, D[O2]IC is the desired or target in-cylinder oxygen mass fraction, RMF is the residual mass fraction, and [O2]Exh is the exhaust [O2] mass fraction estimate. In certain forms, the EGR fraction reference is determined in accordance with the equation Xegr=(D[O2]IN−[O2]AIR)/ ([O2]EGR−[O2]AIR), where Xegr is the EGR fraction reference, D[O2]IN is the desired or targeted intake [O2] mass fraction, [O2]EGR is the EGR [O2] mass fraction, and [O2]AIR is the intake air [O2] mass fraction. In certain forms, the first engine emission characteristic comprises limit on at least one of engine-out smoke, engine-our soot and engine-out hydrocarbon. In certain forms, the first engine emission characteristic is empirically determined based on one or more sets of data accounting for transient engine system operation. In certain forms, the second engine emission characteristic comprises an engine out NOx limit. In certain forms, the second engine emission characteristic comprises an engine out NOx limit and one or more steady state limit for one or more of engine-out smoke, engine-our soot and engine-out hydrocarbon. In certain forms, the one or more air handling actuators comprise an EGR valve actuator, a variable geometry turbine actuator and an intake throttle valve actuator. Certain forms further comprise scaling one of the in-cylinder [O2] mass fraction target and the EGR fraction reference with a first scaling operation if a first tracking error threshold condition is satisfied and scaling one of the in-cylinder [O2] mass fraction target and the EGR fraction reference with a second scaling operation if a second tracking error threshold condition is satisfied. In certain forms, the EGR fraction reference is determined in accordance with the equation Xegr=(D[O2]IN−[O2]AIR)/([O2]Exh−[O2]AIR), where Xegr is the EGR fraction reference, D[O2]IN is the desired or targeted intake [O2] mass fraction, [O2]Exh is the exhaust [O2] mass fraction, and [O2]AIR is the intake air [O2] mass fraction.

A third exemplary embodiment is a system comprising: an electronic control system in operative communication with an internal combustion engine system, the electronic control system being structured to determine an in-cylinder O2 target using a first input, a second input, and a third input, the first input configured to provide a first limit on a first engine emission characteristic, the second input configured to provide a second limit on a second engine emission characteristic, the third input configured to indicate a condition of the internal combustion engine system, determine an intake O2 target in response to the in-cylinder O2 target, a residual gas value, and an exhaust O2 value, determine an EGR fraction reference in response to the intake O2 target, an EGR O2 value, and an air O2 value, and control one or more air handling actuators of the internal combustion engine system in response to the EGR fraction reference.

In certain forms of the third exemplary embodiment, the in-cylinder O2 target comprises one of an in-cylinder [O2] mass fraction target, an in-cylinder [O2] molar fraction target, and an in-cylinder O2 mass target. In certain forms the intake O2 target comprises one of an intake [O2] mass fraction target, an intake [O2] molar fraction target, and an intake O2 mass target. In certain forms the residual gas value comprises a residual mass fraction, the exhaust O2 value comprises an exhaust [O2] mass fraction, the EGR O2 value comprises an EGR [O2] mass fraction, and the air O2 value comprises an air [O2] mass fraction. In certain forms the third input is configured to indicate one of a current operating state of the internal combustion engine system, a past operating state of the internal combustion engine system, and a future operating state of the internal combustion engine system.

A fourth exemplary embodiment is a method comprising: providing an electronic control system in operative communication with an internal combustion engine system; and operating the electronic control system to determine an in-cylinder O2 target using a first input, a second input, and a third input, the first input providing a first limit on a first engine emission characteristic, the second input providing a second limit on a second engine emission characteristic, the third input indicting a condition of the internal combustion engine system, determine an intake O2 target in response to the in-cylinder O2 target, a residual gas value, and an exhaust O2 value, determine an EGR fraction reference in response to the intake O2 target, one of an EGR O2 value and an exhaust O2 value, and an air O2 value, and control one or more air handling actuators of the internal combustion engine system in response to the EGR fraction reference.

In certain forms of the fourth exemplary embodiment, the in-cylinder O2 target comprises one of an in-cylinder [O2] mass fraction target, an in-cylinder [O2] molar fraction target, and an in-cylinder O2 mass target. In certain forms the intake O2 target comprises one of an intake [O2] mass fraction target, an intake [O2] molar fraction target, and an intake O2 mass target. In certain forms the act of operating the electronic control system to determine an EGR fraction reference is in response to the EGR O2 value, and the residual gas value comprises a residual mass fraction, the exhaust O2 value comprises an exhaust [O2] mass fraction, the EGR O2 value comprises an EGR [O2] mass fraction, and the air O2 value comprises an air [O2] mass fraction. In certain forms the third input is configured to indicate one of a current operating state of the internal combustion engine system, a past operating state of the internal combustion engine system, and a future operating state of the internal combustion engine system. In certain forms the act of operating the electronic control system to determine an EGR fraction reference is in response to the exhaust O2 value, and the residual gas value comprises a residual mass fraction, the exhaust O2 value comprises an exhaust [O2] mass fraction, the exhaust O2 value comprises an exhaust [O2] mass fraction, and the air O2 value comprises an air [O2] mass fraction.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:
1. A system comprising:
an electronic control system in operative communication with an internal combustion engine system, the electronic control system being structured to
determine an in-cylinder [O2] mass fraction target using a first input, a second input, and a third input, the first input configured to provide a first limit on a first engine emission characteristic, the second input configured to provide a second limit on a second engine emission characteristic, the third input configured to indicate a condition of the internal combustion engine system,
determine an intake [O2] mass fraction target in response to the in-cylinder [O2] mass fraction target, a residual mass fraction, and an exhaust [O2] mass fraction, determine an EGR fraction reference in response to the intake [O2] mass fraction target, an EGR [O2] mass fraction, and an air [O2] mass fraction, and control one or more air handling actuators of the internal combustion engine system in response to the EGR fraction reference.

2. The system of claim 1 wherein the in-cylinder [O2] target is determined as one of the minimum, the maximum and a weighted function of the first input, the second input, and the third input.

3. The system of claim 1 wherein the intake [O2] mass fraction target is determined in accordance with the equation D[O2]IN=((D[O2]IC)−(RMF*[O2]Exh))/(1−RMF), where D[O2]IN is the intake [O2] mass fraction target, D[O2]IC is the desired or target in-cylinder oxygen mass fraction, RMF is the residual mass fraction, and [O2]Exh is the exhaust [O2] mass fraction estimate.

4. The system of claim 1 wherein the EGR fraction reference is determined in accordance with the equation Xegr=(D[O2]IN−[O2]AIR)/([O2]EGR−[O2]AIR), where Xegr is the EGR fraction reference, D[O2]IN is the desired or targeted intake [O2] mass fraction, [O2]EGR is the EGR [O2] mass fraction, and [O2]AIR is the intake air [O2] mass fraction.

5. The system of claim 1 wherein the first engine emission characteristic comprises limit on at least one of engine-out smoke, engine-our soot and engine-out hydrocarbon.

6. The system of claim 1 wherein the first engine emission characteristic is empirically determined based on one or more sets of data accounting for transient engine system operation.

7. The system of claim 1 wherein the second engine emission characteristic comprises an engine out NOx limit.

8. The system of claim 1 wherein the second engine emission characteristic comprises an engine out NOx limit and one or more steady state limit for one or more of engine-out smoke, engine-our soot and engine-out hydrocarbon.

9. The system of claim 1 wherein the one or more air handling actuators comprise an EGR valve actuator, a variable geometry turbine actuator and an intake throttle valve actuator.

10. The system of claim 1 further comprising scaling one of the in-cylinder [O2] mass fraction target and the EGR fraction reference with a first scaling operation if a first tracking error threshold condition is satisfied and scaling one of the in-cylinder [O2] mass fraction target and the EGR fraction reference with a second scaling operation if a second tracking error threshold condition is satisfied.

11. The system of claim 1 wherein the EGR fraction reference is determined in accordance with the equation Xegr=(D[O2]IN−[O2]AIR)/([O2]Exh−[O2]AIR), where Xegr is the EGR fraction reference, D[O2]IN is the desired or targeted intake [O2] mass fraction, [O2]Exh is the exhaust [O2] mass fraction, and [O2]AIR is the intake air [O2] mass fraction.

12. A system comprising:
an electronic control system in operative communication with an internal combustion engine system, the electronic control system being structured to
determine an in-cylinder O2 target using a first input, a second input, and a third input, the first input configured to provide a first limit on a first engine emission characteristic, the second input configured to provide a second limit on a second engine emission characteristic, the third input configured to indicate a condition of the internal combustion engine system, determine an intake O2 target in response to the in-cylinder O2 target, a residual gas value, and an exhaust O2 value, determine an EGR fraction reference in response to the intake O2 target, an EGR O2 value, and an air O2 value, and control one or more air handling actuators of the internal combustion engine system in response to the EGR fraction reference.

13. The system of claim 12 wherein the in-cylinder O2 target comprises one of an in-cylinder [O2] mass fraction target, an in-cylinder [O2] molar fraction target, and an in-cylinder O2 mass target.

14. The system of claim 12 wherein the intake O2 target comprises one of an intake [O2] mass fraction target, an intake [O2] molar fraction target, and an intake O2 mass target.

15. The system of claim 12 wherein the residual gas value comprises a residual mass fraction, the exhaust O2 value comprises an exhaust [O2] mass fraction, the EGR O2 value comprises an EGR [O2] mass fraction, and the air O2 value comprises an air [O2] mass fraction.

16. The system of claim 12 wherein the third input is configured to indicate one of a current operating state of the internal combustion engine system, a past operating state of the internal combustion engine system, and a future operating state of the internal combustion engine system.

17. A method comprising:
providing an electronic control system in operative communication with an internal combustion engine system; and
operating the electronic control system to
determine an in-cylinder O2 target using a first input, a second input, and a third input, the first input providing a first limit on a first engine emission characteristic, the second input providing a second limit on a second engine emission characteristic, the third input indicting a condition of the internal combustion engine system,
determine an intake O2 target in response to the in-cylinder O2 target, a residual gas value, and an exhaust O2 value,
determine an EGR fraction reference in response to the intake O2 target, one of an EGR O2 value and an exhaust O2 value, and an air O2 value, and
control one or more air handling actuators of the internal combustion engine system in response to the EGR fraction reference.

18. The method of claim 17 wherein the in-cylinder O2 target comprises one of an in-cylinder [O2] mass fraction target, an in-cylinder [O2] molar fraction target, and an in-cylinder O2 mass target.

19. The method of claim 17 wherein the intake O2 target comprises one of an intake [O2] mass fraction target, an intake [O2] molar fraction target, and an intake O2 mass target.

20. The method of claim 17 wherein the act of operating the electronic control system to determine an EGR fraction reference is in response to the EGR O2 value, and the residual gas value comprises a residual mass fraction, the exhaust O2 value comprises an exhaust [O2] mass fraction, the EGR O2 value comprises an EGR [O2] mass fraction, and the air O2 value comprises an air [O2] mass fraction.

21. The method of claim 17 wherein the third input is configured to indicate one of a current operating state of the internal combustion engine system, a past operating state of the internal combustion engine system, and a future operating state of the internal combustion engine system.

22. The method of claim 17 wherein the act of operating the electronic control system to determine an EGR fraction reference is in response to the exhaust O2 value, and the residual gas value comprises a residual mass fraction, the exhaust O2 value comprises an exhaust [O2] mass fraction, the exhaust O2 value comprises an exhaust [O2] mass fraction, and the air O2 value comprises an air [O2] mass fraction.

* * * * *